Aug. 2, 1938.                    H. MØLLER                    2,125,644
                          STEERING DEVICE FOR VEHICLES
                              Filed Jan. 20, 1936
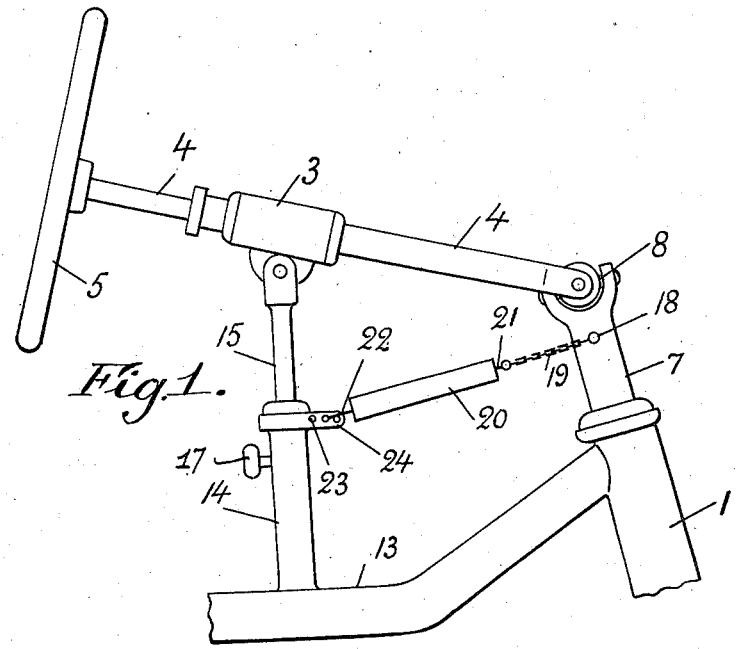
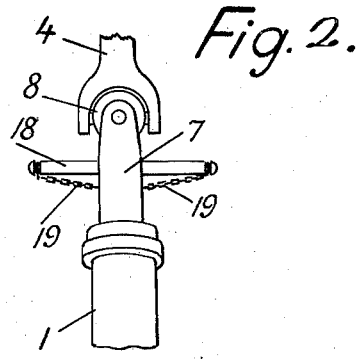
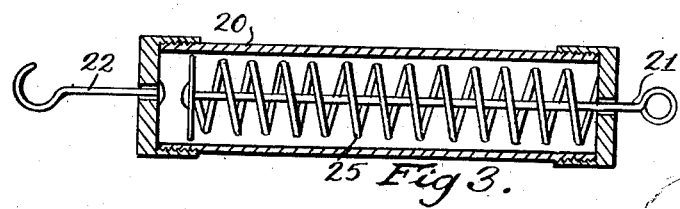
Holger Møller
INVENTOR
his ATTY.

Patented Aug. 2, 1938

2,125,644

UNITED STATES PATENT OFFICE 2,125,644

STEERING DEVICE FOR VEHICLES

Holger Møller, Copenhagen, Denmark

Application January 20, 1936, Serial No. 59,886
In Denmark April 25, 1935

1 Claim. (Cl. 280—271)

My present invention relates to steering device for vehicles, more particularly to steering devices for bicycles, tricycles or the like vehicles propelled by human force.

Such vehicles have at present in the most cases a frame-pipe serving as a bearing for the steering shaft, which is connected to the front wheel, whereas a handle bar with two grips is fastened on said steering shaft. It is also known to use a steering-wheel shank connected by means of an universal joint to the steering shaft instead of such handle bar.

The present invention has for its object to form such steering device using a steering-wheel shaft, for cycles, especially such as the long-low-frame type, in such a manner, that a cycle of one certain size, by a simple adjustment of the parts, can be caused to fit grown-up persons of either sex as well as children. Hereby the manufacture becomes very cheap, as the factory has merely to produce one single size of all the parts used.

A further object of the invention is to make the steering, using such a steering wheel shank connected to the steering shaft or fork by means of an universal joint more secure and efficient as prior known. By using such a steering-device in certain positions of the steering-wheel shank a little motion will cause a large motion of the fork, and therefore it will in such positions of the shank be difficult to prevent the front wheel from turning farther than intended to.

According to the present invention these objects are attained in that the said steering-wheel shank is composed of at least two parts adapted to slide in one another and to be clamped together, in such a manner that the length of the shank can be altered. Besides, the wheel shank is supported in an adjustable bearing on the frame of the bicycle, in such a manner that the angle between the steering-wheel shank and the fork head can be altered.

Further a resilient connection between the fork and the frame of the cycle is used, in such a manner, that this connection will tend to maintain the front wheel directed straight forward, hereby causing a more secure and efficient steering.

On the accompanying drawing a construction according to the invention is shown in order to exemplify the same. It will be understood, that the illustrations do not limit the invention to the features shown.

Fig. 1 shows the connection between the wheel shank and the fork head.

Fig. 2 the same in front elevation.

Fig. 3 is a substantially longitudinal sectional view through a resilient member.

In the construction shown in Fig. 1, there is provided on the frame tube 13 a post 14, 15 consisting of a tubular part 14 in which a rod 15 can slide up and down and be fixed in a desired position by a clamping screw 17. On the top of the rod 15 a bearing is hingedly attached, forming a bearing 3 for a steering-wheel shank 4 consisting of at least two pieces and supporting a steering wheel 5 and being connected, by means of a universal joint 8 to the steering shaft on fork head 7 of the cycle.

Further the steering shaft or fork head 7 is fitted with two transverse pins 18, which support pieces of chain 19 connected to a rod 21 actuated by a spring 25 and adapted to slide in a casing 20. The casing 20 supports a hook 22 engaging one of several holes 23 in an arm 24 attached to the post 14. The spring 25 maintains the rod 21 pressed into the casing 20, in such a manner that the spring tends to maintain the steering shaft or fork head 7 in the position corresponding to the front wheel aiming to roll straight forward.

The power by which the fork head is straightened up by the resilient connection can be altered to some extent by hooking the hook 22 into another one of the holes 23.

I claim:

In a steering device for cycles having a steering shaft connected by means of a universal joint to a steering wheel shank, an axially adjustable telescopic support having a bearing to support the steering wheel shank at any angle and at a point beyond the universal connection with the said steering shaft, means to lock the telescopic support in any axial adjustment thereof, and a resilient connection between the telescopic support and steering shaft to yieldably hold the latter against axial rotation and in a straight forward steering position.

HOLGER MØLLER.